United States Patent [19]

Stahl

[11] Patent Number: 4,552,252
[45] Date of Patent: Nov. 12, 1985

[54] CARRIER BODY FOR A DISC BRAKE PAD

[76] Inventor: Kurt Stahl, Wahner Strasse 19 - 21, 5000 Köln 21, Fed. Rep. of Germany

[21] Appl. No.: 185,381

[22] Filed: Sep. 8, 1980

[30] Foreign Application Priority Data

Sep. 6, 1979 [DE] Fed. Rep. of Germany ....... 2935943
Aug. 8, 1980 [DE] Fed. Rep. of Germany ....... 3030003

[51] Int. Cl.⁴ .............................................. F16D 65/04
[52] U.S. Cl. ...................... 188/73.1; 164/98; 188/250 B; 188/256; 188/258; 428/68; 428/450
[58] Field of Search .............. 188/256, 255, 257, 258, 188/261, 250 B, 251 R, 251 M, 251 A, 254, 264 G, 73.1; 428/68, 450; 164/98

[56] References Cited

U.S. PATENT DOCUMENTS

| | | | |
|---|---|---|---|
| 85,799 | 1/1869 | Day | 164/98 X |
| 780,072 | 1/1905 | Streeter | 188/257 |
| 996,623 | 7/1911 | Dickinson | 188/258 |
| 1,402,117 | 1/1922 | Thompson | 188/257 X |
| 2,801,714 | 8/1957 | Dotto | 188/251 A X |
| 3,064,769 | 11/1962 | Billmeyer | 188/251 R X |
| 3,477,551 | 11/1969 | Beuchle et al. | 188/250 B |
| 3,919,755 | 11/1975 | Kaneko et al. | 164/98 X |
| 4,173,681 | 11/1979 | Durrieu et al. | 188/251 A X |
| 4,230,207 | 10/1980 | Stahl | 188/73.1 |

FOREIGN PATENT DOCUMENTS

| | | | |
|---|---|---|---|
| 570864 | 2/1959 | Canada | 188/251 R |
| 613503 | 1/1961 | Canada | 188/251 R |
| 1575898 | 1/1970 | Fed. Rep. of Germany | 188/250 B |
| 2432482 | 1/1975 | Fed. Rep. of Germany | 164/98 |
| 2743869 | 4/1978 | Fed. Rep. of Germany | 188/73.1 |
| 2722194 | 11/1978 | Fed. Rep. of Germany | 188/264 G |
| 2272966 | 12/1975 | France | 164/98 |

*Primary Examiner*—George E. A. Halvosa
*Attorney, Agent, or Firm*—Spencer & Frank

[57] ABSTRACT

A carrier body of a brake pad for disc brakes, which carrier body is arranged to support a friction coating of the brake pad and includes a plate-shaped molded member of a hard ceramic material presenting a rear face and a circumferential edge face, and a cover secured to the member and contacting the rear face of the member. The cover is made of a material which can be shaped under pressure and/or heat and which is formed to additionally encase the circumferential edge face of the plate-shaped molded member.

7 Claims, 12 Drawing Figures

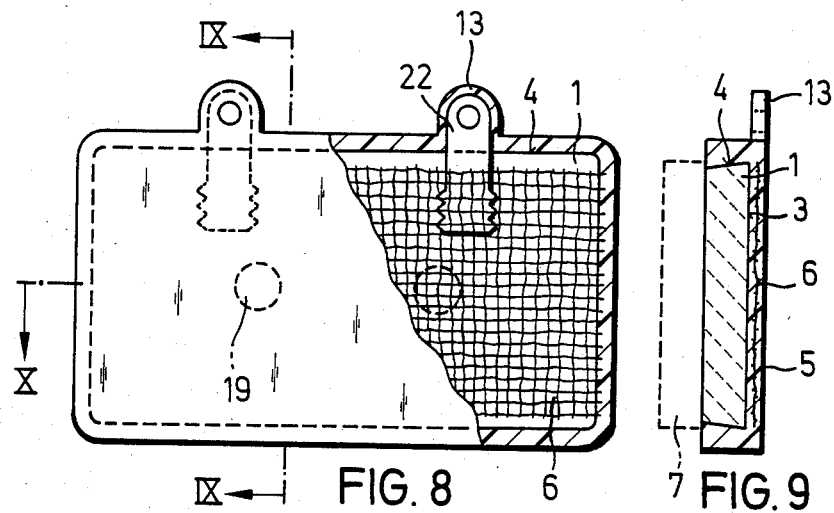
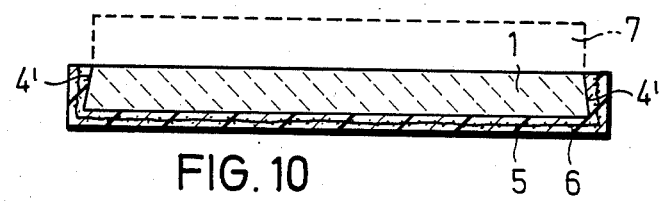
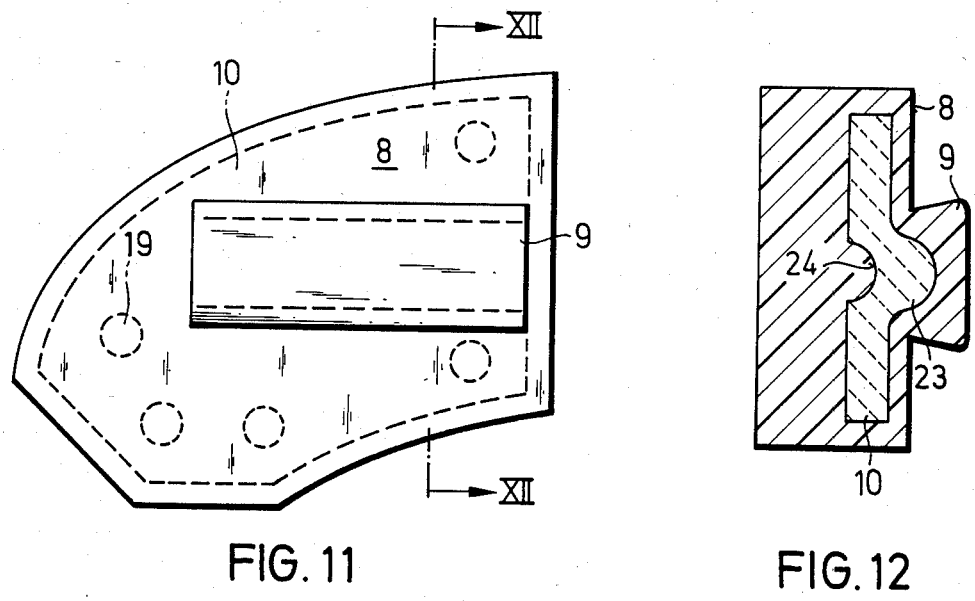

CARRIER BODY FOR A DISC BRAKE PAD

BACKGROUND OF THE INVENTION

The invention relates to a carrier plate for the friction coating, or block, of a brake pad for disc brakes, the carrier plate comprising a disc-shaped molded member of a hard ceramic material whose rear face is provided with a cover.

German Pat. No. 2,734,585 discloses a carrier plate of the above-identified type in which, however, the cover of the rear face consists of a metal sheet. This not only requires an additional molding process for the manufacture of the metal protective cover but also additional measures to connect the molded ceramic member firmly with the protective cover, for example by gluing. Since the friction coating must be pressed onto the frontal face of the molded ceramic member of the carrier plate, there exists the danger that the carrier plate may break during this procedure. The production of molded ceramic members involves firing and/or sintering of the green blank which inevitably leads to certain deviations in dimension or shape due to the so-called shrinkage. Moreover, a slight amount of warping cannot be avoided in practice so that such molded ceramic members "rest hollow" in the pressing mold when the coating material is pressed on and may be destroyed by the compressive pressure even if the rear face is provided with a casing of sheet steel.

The term "hard ceramic material" here refers particularly to hard porcelains and hard ceramics as defined in DIN [German Industrial Standard] No. 40685.211, i.e., a dense hard ceramic material containing predominantly magnesium silicate. In connection with the present invention, however, this term is not limited to the above defined materials but also covers glass and glass ceramics or the like.

SUMMARY OF THE INVENTION

It is now the object of the invention to provide the rear face of the plate-shaped molded ceramic member with a covering which forms a planar contact face for subsequent further processing and for later operation, independent of possible deviations in shape or dimension of the molded ceramic member.

This is accomplished according to the invention in that the cover is made of a material which can be shaped under pressure and/or heat and encloses the rear face as well as the circumferential edge face of the plate-shaped molded member. This has the advantage that the molded ceramic member is already firmly connected with the cover when the latter is being applied, whereby the molded ceramic member is form-lockingly embedded into the cover since, in addition to the rear face, the circumferential narrow edge face is also enclosed by the cover material. Since, in order to apply the cover, the molded ceramic member has to be placed into a suitable mold, into which the cover material is then introduced by pouring or pressing, the rear face of a carrier plate produced in this manner as formed by the cover then is a planar face which is a result of the shaping process taking place during the production of the cover. This planar face serves as a planar contact face in the pressing mold during the subsequent step of pressing the coating, or block, of friction material onto the free frontal face of the molded ceramic member. Inaccuracies in shape, warpage or the like in the molded ceramic member are thus compensated by the cover so that the subsequent application of the friction material which takes place at very high pressure cannot cause destruction of the molded ceramic member.

In a preferred embodiment of the invention, the problem is solved in that the cover is made of metal and is applied by a pressure casting process. As already mentioned, deviations in dimensions or shape of the molded ceramic member do not play a part in the pressure casting process since the molten metal, when introduced into the casting mold, completely encloses the region to be coated and thus the metallic cover will come into close contact with all sides of the molded member. Moreover, a series of different alloys on the basis of zinc, aluminum, magnesium, copper, lead and tin are available for the selection of the casing, or cover, material and these materials meet the various requirements and desires regarding strength, chemical stability, cuttability and surface treatment. By encasing the respective region of the molded ceramic member, a firm connection is established between the molded ceramic member and the metallic cover, a connection without play, since shrinkage of the metal during cooling holds the metal casing on the molded ceramic body with a certain tension. On the other hand, the pressure resistance of the ceramic materials under consideration here is so high that the contraction strain is absorbed by the metal casing. In particular, the tension exerted by the complete encasing of the circumferential edge face which becomes effective in the planar expanse of the plate causes the resistance of the brittle-hard ceramic plate with respect to bending stresses transversely to the plane of the plate to be improved considerably. The metal covering on the rear face of the plate-shaped molded member results in a protection which is particularly effective against concentrated mechanical stresses. Furthermore, even if the ceramic plate breaks, the individual broken pieces are held by the pressure cast casing, particularly by the portion encasing the circumferential edge face. The cover on the rear face can be selected to be considerably thinner than the thickness of the plate so that the heat insulating properties of the ceramic material can be utilized in the form of the thickest possible plate. The thickness of the thus formed carrier plate nevertheless does not exceed the thickness of the conventional steel carrier plates. A brake pad including the carrier plate according to the invention can therefore be used without difficulty as a replacement for a conventional brake pad having a steel carrier plate. An advantageous feature of the invention provides that the part of the metallic cover which covers the rear face of the plate has at least one opening, preferably a slit-like opening. This makes it possible to avoid breakage of the ceramic plate during the cooling process subsequent to the production of the pressure cast casing due to differences in thermal expansions of ceramic and metal. An advantageous feature provides, in this connection, that the rear face of the plate has projections which penetrate the metallic cover. This design for plate-shaped ceramic members has the advantage that the projections, which are preferably designed in the form of continuous bars, result in an improvement of the mechanical strength of the plate and, on the other hand, the openings provided for the prevention of breaks during pressure casting of the casing are produced already during the pressure casting process so that the manufacturing process is simplified considerably. It is likewise of advantage if, according to the invention, the part of the metallic cover covering the circumferential edge face of the plate has essentially the same thickness so that here again, differences in stresses in the cover as a result of the cooling process are substantially avoided.

In connection with the invention, it is furthermore advisable for the outer edge of the frontal face of the plate to be chamfered, the chamfered section being enclosed by the metallic cover. This results in a form-locking connection between the cover and the plate. Instead of the chamfered section, it is also possible to make the circumferential edge face slightly conically tapered with respect to the frontal face of the plate.

A further advantageous feature provides that the exposed frontal face of the plate is provided with recesses During application of the friction material, such recesses provide additional form-locking anchoring of the friction material on the molded ceramic member in addition to the conventional connection between friction coating and carrier plate by means of adhesive. It is of particular advantage if, according to the invention, the recesses in the frontal face correspond in shape approximately to the projections in the rear face. In this way, the ceramic plate will have an essentially uniform material thickness over its entire area so that stresses in the ceramic material caused by multiple heating in the course of the manufacturing process of the molded ceramic members, during the application of the cover and during the application of the friction coating are avoided.

The use of a ceramic carrier body for the friction coating of a brake pad in a disc brake is known per se from German Auslegeschrift [published patent application] 2,734,585. The particular advantage of the pressure cast casing of such a ceramic carrier plate for the friction coating resides, however, in that the metallic cover can be produced in one process step together with the necessary tongues at its side for fastening the brake pad to the brake caliper and that the metals or metal alloys suitable for the pressure casting process, due to their mechanical properties, protect the ceramic plate against sudden and/or concentrated stresses in the region where the edge faces contact the brake caliper and where the rear face contacts the pressure cylinder. Furthermore, the metallic cover according to the invention provides an additional safety for the ceramic plate, if due to inadvertent external influences the ceramic plate should break, since the broken pieces would be firmly held together by the circumferential edge face and by the back while, on the other hand, the friction coating applied to the frontal face of the ceramic plate would prevent the broken pieces from falling out there so that even in such a case the ceramic plate could perform its primary function, namely to effect, due to its poorer heat conductivity than metal, the required heating of the friction coating already shortly after initiation of the braking process and with a low braking force.

According to another advantageous feature of the invention, the cover of the rear face and of the circumferential edge face is made of a synthetic material. The synthetics presently available are stable even at high temperatures and have the requisite mechanical strength. It is a particular advantage in this connection that the molded ceramic member has a heat damping effect and thus reduces heating of the cover during the braking process.

Another preferred feature of the invention provides that a preferably grid-shaped reinforcement is embedded in the synthetic cover material. Particularly if thermosetting synthetics are used, this increases the strength of the cover and the grid-shaped structure of the reinforcement permits its complete embedment in the synthetic mass.

According to another feature of the invention, it is of advantage for the reinforcement to extend into the area of at least two facing frontal faces. These are preferably the frontal faces which during later operation during braking transmit the reaction forces introduced into the brake pad to the caliper. According to the invention, the reinforcement is formed by a fabric of wire, glass or synthetic fibers. Although the poor heat conductivity of the hard ceramic material permits the heat generated during the braking process to enter the cover of the rear face only to a slight degree, the synthetic material for the cover as well as the material used in the form of synthetic fibers must nevertheless be stable in the temperature ranges involved here, i.e. they must not melt or decompose.

A further feature of the invention provides that fastening elements are anchored in the cover so as to extend beyond the edge face. These fastening elements generally have the shape of eyes with the aid of which the finished brake pads are fixed and secured in the associated caliper by means of retaining pins. In the present case, these fastening elements can be formed by bent or cut-out metal members which, according to a further feature of the invention, are form-lockingly connected with the reinforcement.

Finally, a feature of the invention provides that the synthetic material of the cover corresponds to the binder used in the friction coating material to be applied. This has the one advantage that the friction coating, on the one hand, and the plastic cover, on the other hand, have approximately the same expansion and pressure resistance behavior. If, for manufacturing reasons, passages are provided in the molded ceramic member, this has the additional advantage that during application of the coating material and of the cover, the respective materials can pass through the passages from both sides and can enter a firm bond with one another in this area which further improves the fixing of the friction coating on the carrier plate.

The invention relates particularly to brake pads for disc brakes in rail-bound vehicles which are characterized, according to the invention, in that a disc-shaped, molded ceramic member has its rear face, its circumferential edge face and also its frontal face completely embedded in friction material. While in the prior art, such brake pads were homogeneous molded members made only of friction material, the design according to the invention permits the utilization of the improvements regarding brake performance that can be realized with a carrier plate consisting essentially of a hard ceramic also for disc brakes on rail-bound vehicles. On the one hand, the heat damping effect of the molded ceramic member embedded in the friction material permits the use of a friction material which has a greater temperature stability, a corresponding heating of the friction material being realized already shortly after the initiation of the braking process even with small braking force. The friction material therefore reaches the required operating temperature much faster so that the full friction power of the coating material is realized practically already upon contact with the brake discs. At the same time, the poor heat conductivity of the hard ceramic material protects the brake mechanism against overheating. A further advantage over the conventional brake pads made only of friction material is that the brake pads are practically rigid as a result of the inserted molded hard ceramic member. This results in a full-area contact against the brake disc extending to the edge regions of the brake pad also under braking which continues for longer periods of time since the rigidity of the molded ceramic member embedded in the friction material prevents "bending up" of the brake pad in the edge region due to different thermal expansion at the contact surface and in the area of the rear face.

The invention will be explained in detail with the aid of schematic drawings of embodiments.

BRIEF DESCRIPTION OF THE DRAWINGS

FIG. 8 is an elecational view of the rear side of a carrier plate, partly in crosssection and with the plastic cover partly removed.

FIG. 9 is a sectional view along line IX—IX of FIG. 8.

FIG. 10 is a sectional view along line X—X of FIG. 8.

FIG. 11 is a top view of the rear face of a brake pad for a disc brake in rail-bound vehicles.

FIG. 12 is a sectional view along line XII—XII of FIG. 11.

DESCRIPTION OF THE PREFERRED EMBODIMENTS

Figure 1:
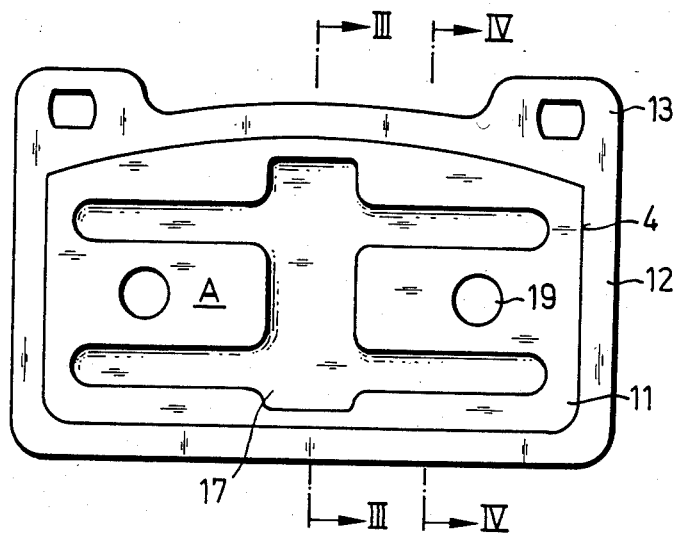
FIG. 1 is an elevational view of the frontal face of the carrier plate of a brake pad for a disc brake.
Figure 2:
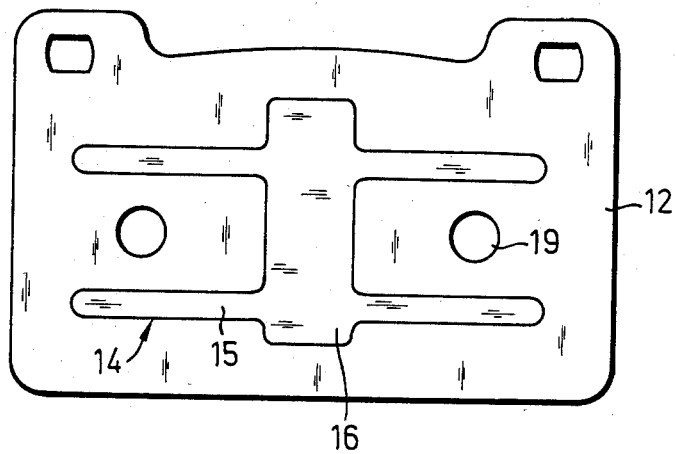
FIG. 2 is an elevational view of the rear side of the carrier plate of FIG. 1.
Figure 3:
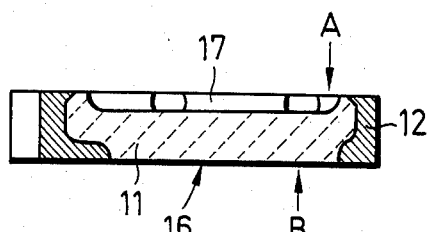
FIG. 3 is a sectional view along line III—III of FIG. 1.
Figure 4:
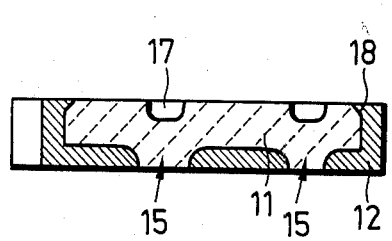
FIG. 4 is a sectional view along line IV—IV of FIG. 1.
Figure 5:
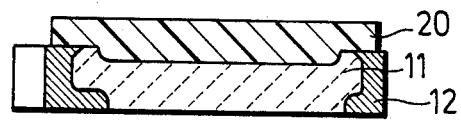
FIG. 5 is a sectional view through a finished brake pad along line III—III of FIG. 1.

FIGS. 1 and 2 show as the exemplary embodiment a carrier plate for the friction coating of a brake pad in a disc brake for a motor vehicle, in a front view (FIG. 1) and in a rear view (FIG. 2), as well as in corresponding sectional views (FIGS. 3, 4, 5). In this embodiment, a plate-shaped ceramic member 11 is connected with a pressure cast casing, or cover, 12 in such a manner that the frontal face A of the ceramic member is completely exposed while the circumferential edge faces 4 of the ceramic member are completely encased and the rear face 3, as can be seen in FIG. 2, is encased only partly in metal. On one side, the pressure cast casing 12 is provided with eyes 13 through which the carrier plate can be fastened to the brake caliper.

On the rear face 3 of the ceramic member, the pressure cast casing is provided with slit-like openings 14 which prevent the ceramic plate 11 from breaking during cooling after it has been encased in the metal casing 12.

As can be seen in the sectional views of FIGS. 3 and 4, the rear side of the ceramic plate 11 is provided with bar-shaped projections 15 and 16 which, in the present embodiment, have approximately the shape of an H. These projections 15 and 16 have such a thickness that they are flush with the pressure cast casing on the rear side of the carrier plate and thus penetrate through the slit-shaped openings 14 and simultaneously delimit them.

On its frontal face, the ceramic plate is provided with recesses 17 whose shape approximately corresponds to the projections 15, 16 of the rear face so that in these regions as well the thickness of the plate remains approximately uniform. The outer edge 18 of the front face of the ceramic plate 11 is chamfered so that, when this part is encased in metal, the ceramic plate is clamped in in this region in a form-locking manner. The through holes 19 serve merely to hold the ceramic plate in the pressure casting mold during the production of the pressure cast casing. When the friction coating is pressed on, however, part of the coating material is pressed in, so that a further increase in the form lock results.

The sectional view of FIG. 5, which is seen along the line III—III of FIG. 1, shows a complete brake pad, i.e. a pressure casting encased carrier plate with attached friction coating, or block, 20. As can be seen in this sectional view, the friction coating 20 is pressed into the H-shaped recess in the frontal face of the ceramic plate 11 so that an additional form-locking support is provided for the friction coating on the carrier plate with respect to the stress extending in the plane of the carrier plate during the braking process.

In the embodiment of a molded ceramic member with profiled rear face as shown in FIGS. 1 and 2, it is of significant importance that at least one, preferably slit-shaped, opening extends in the pressure cast casing transversely to the greatest length of the molded member. In this connection, it is important to design the pressure casting mold in such a way that this slit-shaped opening remains free already during the pressure casting process, i.e. no liquid metal can enter into this area and the pressure cast casing remains interrupted in this area right from the start. In this way, deformations due to material shrinkage during cooling which could have an adverse effect on the ceramic member are avoided. The number, position and orientation of the slit-shaped openings, however, depend on the geometry of the molded member in question.

Figure 6:
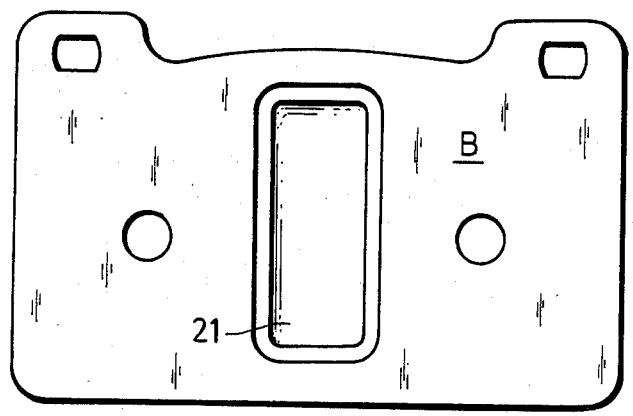
FIGS. 6 and 7 are, respectively, an elevational view and a cross-sectional view of an embodiment including an expansion notch.
Figure 7:
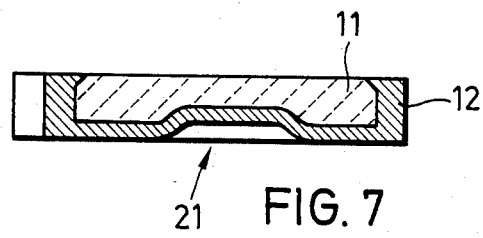

FIGS. 6, 7 show another structural solution of the problem of material shrinkage occurring during cooling of the pressure cast casing. The embodiment selected here is again the carrier plate of a brake pad for a disc brake. However, the proposed principle can be used in principle here mainly for planar molded members. As is evident, in particular, from the sectional view of FIG. 7, the pressure cast casing 12 is provided with at least one deformation notch 21 which here again preferably extends transversely to the greatest length of the molded member. It is expedient in this connection if the wall thickness of the pressure cast casing is somewhat less in the area of the deformation notch than in the other areas so that during the shrinkage process during cooling and the corresponding expansion of the notch transverse to its orientation, there is provided sufficient resilience in the material without the pressure cast casing cracking in this area. This embodiment is significant, in particular, when for the intended use the rear face of the molded ceramic member is to be defined by the pressure cast casing. Here again, the size, number and orientation of such deformation notches depends essentially on the geometry of the molded member in question.

The carrier plate for a brake pad of a motor vehicle disc brake shown in FIGS. 8, 9 and 10 comprises a molded ceramic member 1 which may be designed in the form of a smooth surface plate or may be provided with raised portions and/or recesses on its frontal face and/or its rear face 3. The rear face 3 as well as the circumferential edge face 4 of the molded ceramic member 1 are provided with a one-piece cover 5 of a synthetic material so that the rear face 3 and the edge faces 4 are completely encased by this cover. As shown, the molded ceramic member 1 is held in the cover 5 in a form-locking manner by means of a chamfer on the circumferential edge between frontal face 2 and edge face 4 or by an edge face 4 which is inclined toward the frontal face 2.

A grid-shaped reinforcement 6 is embedded in the plastic of the cover and extends preferably into the region of the opposing narrow edge faces 4' (FIG. 10). This grid-shaped reinforcement is preferably formed by a fabric of wire, glass or synthetic fibers. This fabric must have such a structure that upon application of the cover the synthetic material can penetrate through the fabric to completely embed the latter. The application of the cover is effected by means of a pressing process which is appropriate for the selected synthetic material. The preferred materials for this purpose are thermosetting, temperature stable synthetics or synthetic mixtures which correspond to the binder for the friction coating material to be applied.

Depending on the selected materials for friction coating and cover or the methods employed, respectively, the friction coating 7 (shown in dashed lines) is pressed onto the frontal face 2 of the molded ceramic member 1 subsequent to the application of the cover 5 or simultaneously therewith.

The customarily required projections 13 at the carrier plate with which the finished brake pad is fixed in the brake assembly are formed, in the illustrated embodiment, by fastening elements, for example cut-out metal members 22 which are also pressed into the cover 5 and expediently are form-lockingly connected with the reinforcement 6.

FIG. 11 shows, to a smaller scale, a brake pad for a disc brake for rail-bound vehicles. FIG. 12 shows a corresponding cross section. Such a brake pad has on its rear face 8 a fastening bar 9 having a dove-tail cross section with which the brake pad is held by the brake mechanism. The brake pad including the fastening bar 9 is made entirely of friction material. According to the invention, however, temperature behavior and shape rigidity are improved by a plate-shaped molded member 10 of a hard ceramic material which is molded into the assembly as well. Expediently, on its side facing the rear face 8, in the region of the fastening bar 9, the molded member 10 is provided with a bar-shaped projection 23 so that the friction forces which attack the brake pad in a direction parallel to the plane of the rear face 8 and which are transmitted from the fastening bar 9 to the brake mount, are also absorbed by the molded ceramic member embedded in the friction material. For reasons of manufacturing technique it is advisable to provide a corresponding recess 24 in the region of the projection 23 on the side of the molded ceramic member 10 facing away from the rear face 8 so that the molded ceramic member has approximately the same wall thickness in all regions.

In the carrier plate according to FIG. 8 as well as in the brake pad according to FIG. 11, the molded ceramic body may be provided with passages 19, for example in the form of cylindrical bores, so that during the simultaneous application of friction coating and synthetic cover, the corresponding quantities of material can penetrate here and thus provide an additional bond in the molded ceramic member between the friction coating and the cover not only in the edge regions but also in the remaining regions.

I claim:

1. In a carrier body of a brake pad for disc brakes, which carrier body is arranged to support a block of friction material of the brake pad and includes a plate-shaped molded member of a hard ceramic material presenting a rear face and a circumferential edge face, and a cover made of metal and secured to the member and contacting the rear face of the member, the improvement wherein said metal cover is applied to said member in a casting process in which molten metal is introduced into a mold containing said molded member to contact the rear face and the circumferential edge face of said molded member and the molten metal is then cooled and solidified to form said metal cover, whereby said metal cover closely contacts the rear face and circumferential edge face of said molded member and additionally encases said circumferential edge face of said plate-shaped molded member and imposes compressive stresses in said molded member and further wherein said molded member has a frontal face opposite said rear face and provided with recesses and said rear face of said molded member is provided with projections which penetrate said metal cover and correspond in their orientation approximately to said recesses in said frontal face.

2. Carrier body according to claim 1 characterized in that the part of said metal cover covering said circumferential edge face of said molded member has an essentially uniform thickness.

3. Carrier body according to claim 1 characterized in that said molded member frontal face is provided with a chamfer which is covered by said metal cover.

4. Carrier body according to claim 1 characterized in that said metal cover has edge regions provided with outwardly oriented projections.

5. Carrier body according to claim 1 combined with a block of friction material, and wherein, in the region of said circumferential edge face of said molded member, said metal cover encloses at least in part the circumferential edge face of said block.

6. Carrier body according to claim 1 wherein the part of said metal cover which covers said rear face of said molded member is provided with at least one opening having the form of a slit.

7. Carrier body according to claim 6 characterized in that the at least one opening in said cover extends essentially transversely to the largest dimension of said molded member.

* * * * *